Jan. 4, 1927.  G. A. PEPLE, JR  1,613,290

TRANSMISSION

Filed July 23, 1926  5 Sheets-Sheet 1

G. A. Peple, Jr.
Inventor

By C. A. Snow & Co.
Attorneys.

Jan. 4, 1927. 1,613,290
G. A. PEPLE, JR
TRANSMISSION
Filed July 23, 1926      5 Sheets-Sheet 3

G. A. Peple, Jr., Inventor.
By C. A. Snow & Co.
Attorneys.

Jan. 4, 1927. 1,613,290
G. A. PEPLE, JR
TRANSMISSION
Filed July 23, 1926 5 Sheets-Sheet 4

G.A.Peple,Jr., Inventor.
By C.A.Snow & Co.
Attorneys.

Jan. 4, 1927.　　　　G. A. PEPLE, JR　　　1,613,290
TRANSMISSION
Filed July 23, 1926　　5 Sheets-Sheet 5

G.A.Peple,Jr, Inventor.
By C.A.Snow&Co.
Attorneys.

Patented Jan. 4, 1927.

1,613,290

UNITED STATES PATENT OFFICE.

GUSTAVE ADOLPHUS PEPLE, JR., OF LYNCHBURG, VIRGINIA.

TRANSMISSION.

Application filed July 23, 1926. Serial No. 124,507.

This invention relates to a transmission of the type used, for example, in motor vehicles, one of the objects being to provide simple and efficient means whereby the ratio of speed between the engine shaft and the driven shaft can be varied at will by actuation of the standard clutch pedal or automatically.

A further objection is to simplify and otherwise improve upon mechanisms of this character.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred forms of the invention has been shown.

In said drawings:

Figure 8 is a plan view of the displacement mechanism showing how it is attached to the transmission unit.

Referring to the figures by characters of reference 1 designates a housing attached directly to the housing A of the fly wheel and clutch of a standard automobile. The housing 1 is provided at its respective ends with bearings 2 and 5. The engine shaft 4 is journaled in the bearing 2 while the driven shaft 4' is journaled in the bearing 3 and alined with the shaft 4.

A gear 5 and a pair of gears indicated at 6 are keyed or otherwise fastened to the shaft 4 so as to rotate therewith and a plate 7 is also secured to said shaft and rotates with it. Another plate 8 is secured to and rotates with the driven shaft 4'.

A brake drum 9 is mounted for rotation on the shaft 4 at one side of the gear 5 and interposed between this brake drum and one of the gears 6 is a plate or disk 10 mounted to rotate on the shaft 4 and having a gear 10' integral therewith and arranged close to the drum 9. Another disk or plate 11 is interposed between the other gear 6 and the plate 7 and is adapted to rotate on shaft 4. A plate or disk 12 is adapted to rotate on the end portion of shaft 4 and has an integral gear 12' at the center thereof extended toward the plate 7.

Mounted to rotate freely on the driven shaft 4' is a disk or plate 13 having an integral central gear 13' extended toward the plate 8.

Journaled within and extending transversely through the brake drum 9 at regular intervals are short shafts to each of which are secured gears 14 and 15. The shafts have been indicated at 16. The gears 14 all mesh with gear 5 while the gears 15 all mesh with the gear 10'. Gears 15 are larger than gears 14 and, accordingly, gear 10' is smaller than gear 5.

Journaled on one side of the plate or disk 10 is a series of preferably three gears 17 and a similar number of gears 18 are provided on one side of the disk or plate 11, these gears 18 being directly opposite the gears 17 and all of the gears 17 and 18 being of the same size. Gears 17 are constantly in mesh with one of the gears 6 while gears 18 are constantly in mesh with the other gear 6.

Journaled on one side of the plate 7 are gears 19 all of which mesh with the gear 12' and with an internal gear 20 in the form of a ring preferably of the same diameter as the disks or plates 10, 11 and 13.

The plate 12 is suitably secured to one end of an inner drum 8' in the other end of which is secured an internal gear 22 in the form of a ring which constantly meshes with a series of gears 21 journaled on one side of the plate 8 and which gears constantly mesh with the gear 13'.

An outer drum 23 is fixedly connected to the disks or plates 10, 11 and 13 and to the ring or internal gear 20 so that they will all rotate as one body. Secured within this drum at regular intervals are radially disposed cylinders 24 each of which contains a piston 25. As before pointed out the gears 17 and 18 are of like construction. These gears, furthermore, are arranged in pairs and the gear of each pair are connected by a cross pin or wrist pin 26'. The pistons 25 are connected to the respective wrist pins 26' by pitmen 26.

The head of each cylinder 24 has a port 27 controlled by a valve 28. A spider 29 is mounted to slide and rotate on the driven shaft 4' and has a number of radial arms equal to the number of cylinders 24. Each valve 28 has an arm 30 and each arm is connected by a link 31 to a rod 32 which, in turn, is pivotally connected to one of the arms of the spider 29. Each rod 32 is guided within bearings 33 and 34 carried by the outer drum 23 and a spring 35 is mounted on each rod and bears at one end against bearings 33 and at its other end against a stop pin 36.

Figure 1:
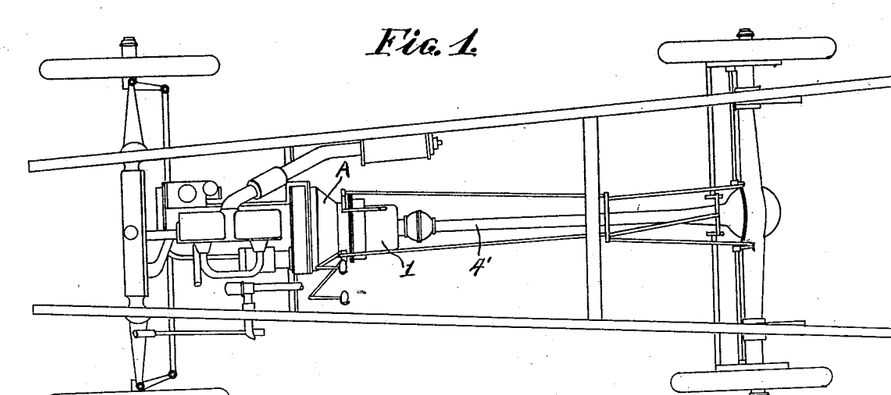
Figure 1 is a plan view of the chassis of an automobile showing the present improvements combined therewith.
Figure 2:
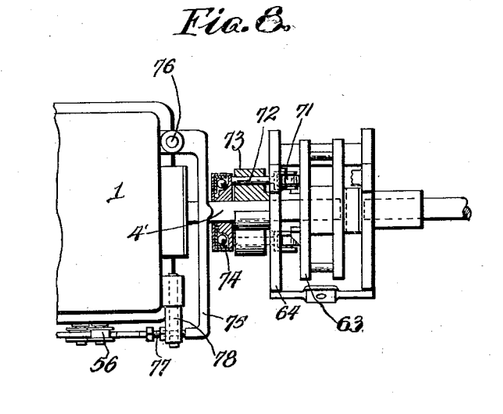
Figure 2 is a section through the transmission unit.
Figure 3:
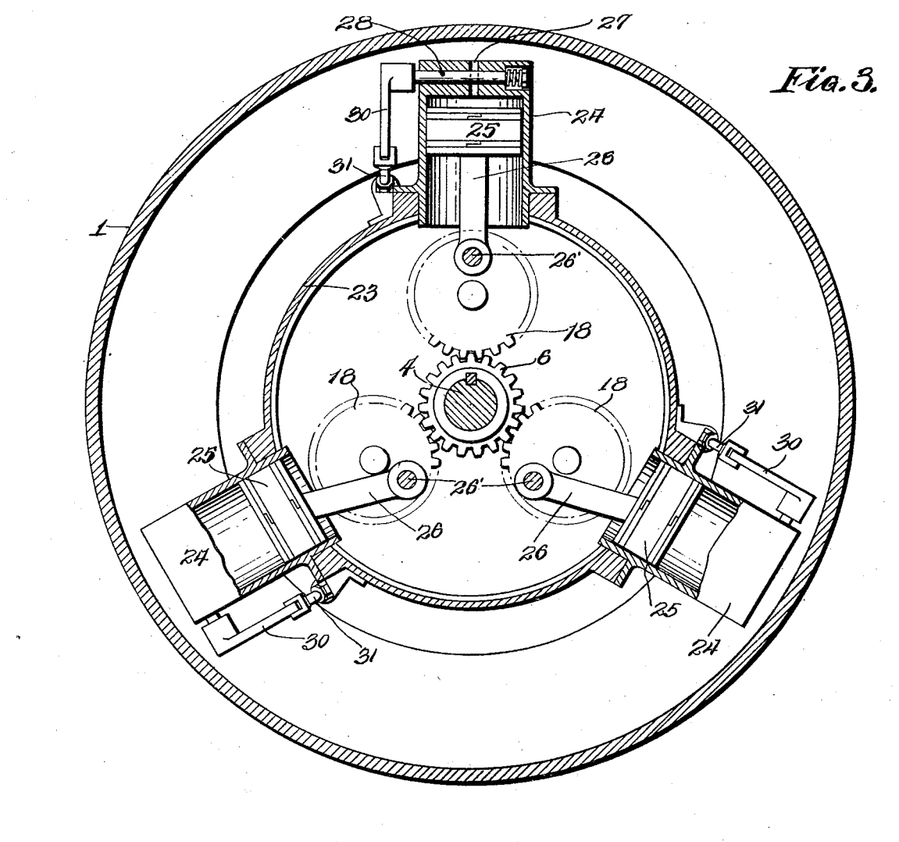
Figure 3 is a section on line 3—3, Figure 2.

Obviously the springs 35 all cooperate to swing the arms 30 away from open positions as shown in Figure 2 so as to maintain the valves 28 closed. The spider 29 has a collar 37 movable therewith and formed with an annular groove 37' whereby said collar can be engaged and actuated by a forked arm 38 extending from a shaft 39. This shaft extends through and is journaled within the housing 1.

The transmission control mechanism includes a lever 40 (see Figure 4) adapted to rotate freely on a shaft 41, this arm 40 being attached to the emergency brake rod R. The emergency brake lever 42 is fixedly connected in any suitable manner to the shaft 41 and, therefore, when this lever is actuated a corresponding rotation of the shaft 41 takes place. The arm or lever 40 has an offset 40' upon that portion thereof engaging the shaft 41 and this offset extends into the path of a similar offset 42' carried by the shaft engaging portion of lever 42. Thus it will be seen that when the emergency brake lever 42 is pulled back by the driver the offset portion 42' will come against the offset portion 40' and cause the arm or lever 40 to pull upon the brake rod R. However, when the lever 42 is swung in the opposite direction, the rod R and the arm or lever 40 will not be actuated.

Figures 4, 5, 9:
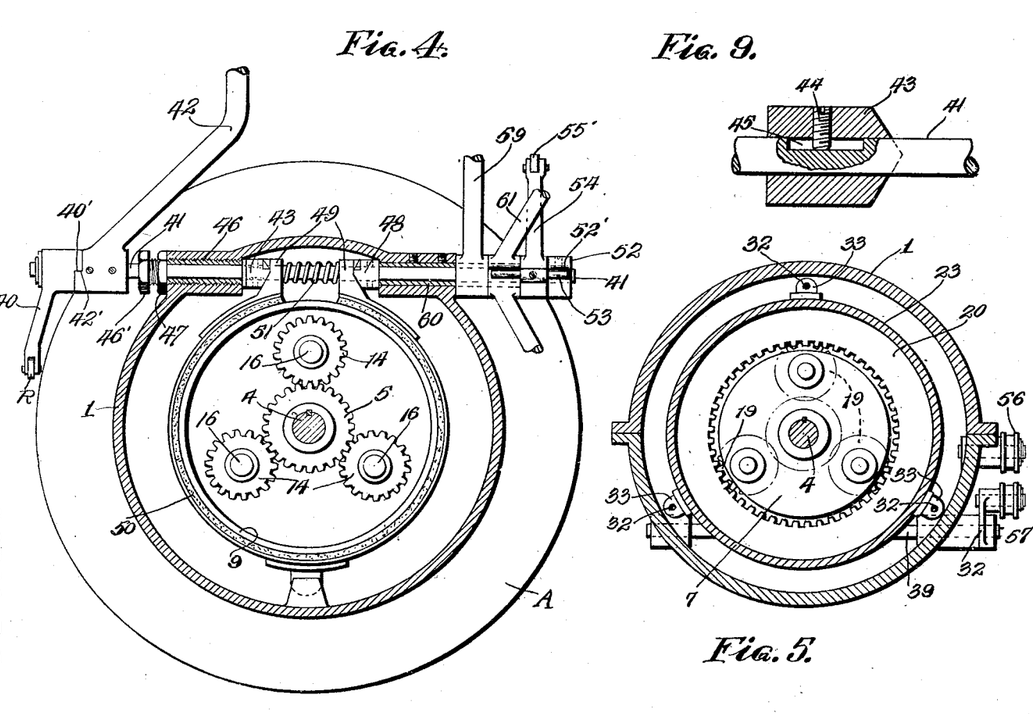
Figure 4 is a section on line 4—4, Figure 2.
Figure 5 is a section on line 5—5, Figure 2.
Figure 9 is an enlarged section through one of the operating cams of the brake band.

A cam 43 is mounted to slide upon but to rotate with the shaft 1, there being a screw 44 extending into the cam and projecting into a groove 45 formed in the shaft 41 as shown particularly in Figure 9. The cam can be adjusted along the shaft by means of a threaded sleeve 46 engaging in the wall of the housing 1 and provided at its outer end with a head 46'. A lock nut 47 may be mounted on this sleeve for the purpose of holding it against unscrewing after the parts have been properly adjusted. Another cam 48 similar to the cam 43 is fixedly secured to the shaft 41 but is disposed oppositely to the cam 43. Extending between these two cams 43 and 48 are cams 49 carried by the end portions of a brake band 50. A spring 51 mounted on shaft 41 and interposed between the cams 49, serves to hold said cams 49 pressed yieldingly against the cams 43 and 48. The barrel 50 is of course extended around the drum 9.

It will be apparent from the foregoing that when lever 42 is pulled back as before explained for the purpose of applying the brake the cams 43 and 48 rotating with the shaft 41, will move upwardly relative to the cams 49 in Figure 4 so that the said cams 49 will not be shifted relative to each other. However should the driver push the lever 42 forwardly from neutral position, the arm or lever 40 would not be affected but the cams 43 and 48 would slidably engage the cams 49 and cause them to move toward each other thereby placing the spring 51 under compression. At the same time the band 50 will be contracted about the drum 9 so as to hold said drum against rotation.

Figures 6, 7:
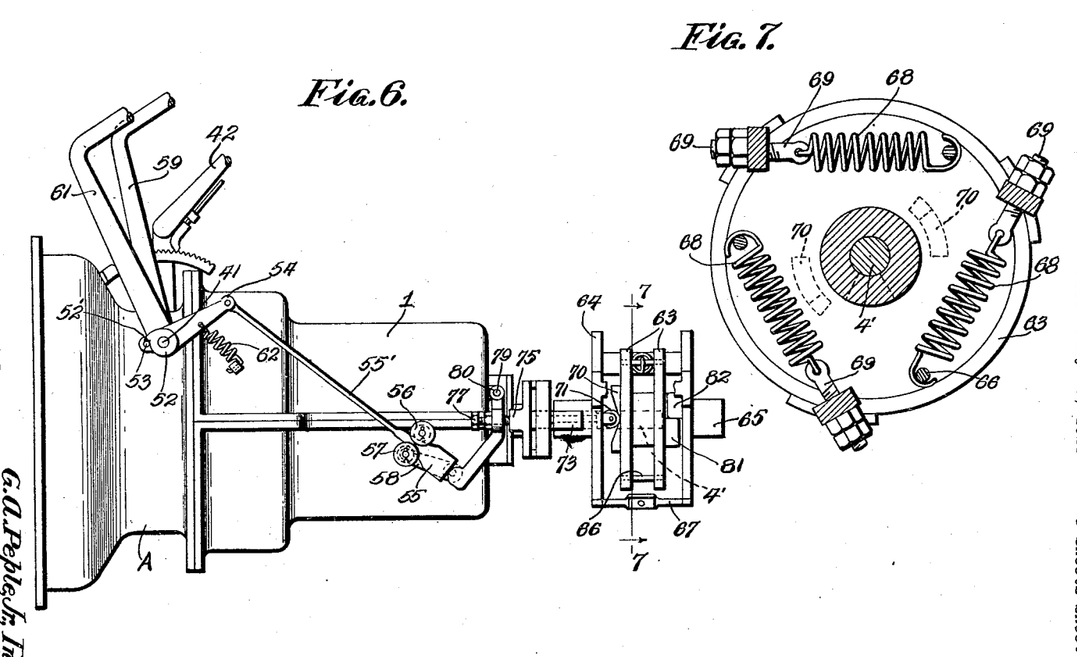
Figure 6 is a side elevation of the transmission unit modified by the addition of an automatic or displacement mechanism.
Figure 7 is a section through the displacement mechanism on the line 7—7, Figure 6, the cams being indicated by broken lines.

A collar 52 is secured to one end of the shaft 41 and has a radial shoulder projecting therefrom as indicated at 52' in Figure 6. Projecting into the path of this shoulder is a pin 53 extending through and fixedly connected to the hub portion of a lever 54. A spreading cam 55 is connected to the lever 54 by means of a stem 55' projecting from the cam and this spreading cam is adapted to work between a roller 56 journaled on a fixed stud upon the housing 1 and a movable roller 57 carried by an arm 58. This arm is secured to the shaft 39. It will be apparent, therefore, that when shaft 39 is rotated in one direction as a result of the movement of the spreading cam 55 the forked arm 38 will shift the spider 29 and cause the valves 28 to be moved to open positions.

The usual foot brake pedal has been indicated at 59 and is mounted to rotate upon a sleeve 60 which is fixedly secured in the housing 1 and constitutes a bearing for the shaft 41. This foot brake pedal 59 is connected to the brake rod in the usual way.

The clutch pedal has been indicated at 61 and is adapted to rotate freely on the fixed sleeve 60. This pedal 61 is connected to the clutch mechanism in the usual way. It will be noted by referring particularly to Figure 4 that one end of the pin 53 extends into the path of the pedal 61. The parts are so disposed relative to each other that when the clutch pedal 61 is depressed it will come against and actuate the pin 53 so as to cause lever 54 to shift and thereby open the valves 28 as heretofore explained. The parts are so proportioned that during the first half of the movement of the pedal 61 while being depressed, the valves 28 will be shifted from completely closed to completely open positions and any further movement of the pedal 61 will have no effect on the valves but will merely serve to disengage the clutch. During the first portion of the movement of the clutch pedal 61 when released the clutch will be engaged while during the remainder of the return movement of the pedal the valves 28 will be brought to closed positions.

That portion of the mechanism thus far described includes a transmission with a means under the control of the driver for regulating at will the relative speed of the shafts 4 and 4'. Assuming that the motor is running, the emergency brake is in neutral position, and the clutch pedal is fully depressed, the driver, by gradually releasing the clutch pedal 61 will allow the arm 54 to be pulled back by the spring 62 shown in Figure 6. During the first portion of the backward movement of the clutch pedal 61 the clutch takes hold and the gearing mechanism is set in motion. The valves 28 remain open because the cam 55 does not release the roller 57 until further movement of the arm 54 has been permitted.

With the parts positioned as explained the shaft 4 rotates the plate 7 therewith and the gears 19 will of course travel with the plate. The shaft 4' of course sets up a resistance to the rotation of plate 8 and the gears 21 carried thereby. Consequently as the valves 28 are opened and air is free to circulate back and forth through the ports 27, the various floating gears will all operate so that no motion will be transmitted from the shaft 4 to the shaft 4'. For example assuming that shaft 4 is revolving at the rate of one revolution per minute the outer drum 23 with the members attached thereto, including the cylinders 24, will revolve in the same direction at the rate of one and one-half revolutions per minute, and the plate 12 and gear 12' together with the inner drum 8' with its gear 22, will turn in the opposite direction at the rate of one-half revolution per minute, leaving the plate 8 and the shaft 4' stationary. There will be a relative motion of one-half revolution per minute between the shaft 4 and the outer drum 23.

When clutch pedal 61 and arm 54 are further released, the cam 55 is moved back from between the rollers 56 and 57. Consequently the arm 58 is permitted to move upwardly under the action of the springs 35 thrusting rod 32 longitudinally and sliding the spider 29 along the shaft 4'. As a result of this action the valve 28 will be gradually closed, thereby gradually shutting off the escape of air from the cylinders 24 and setting up a compression of the air or other fluid in the cylinders. This retards the motion of the pistons 25, the retardation being controlled by the position of the valves. Obviously as the pistons are retarded the rotation of the gears 17 and 18 is also retarded. Consequently the relative motion between the outer drum 23 and shaft 4 is decreased by one-half revolution per minute to zero during which time the plate 8 is given a motion increasing gradually from zero to one revolution per minute at which time the valve 28 becomes fully closed and the entire gearing including that mounted on the shafts 4 and 4' turns as a unit at engine speed.

When it is desired to run the car backwardly, the clutch pedal 61 is fully depressed and the engine is thus permitted to spin freely. The emergency brake lever 42 is then pushed forwardly from neutral position with the result that the cams 43 and 48 are rotated and cause the cams 49 to shift towards each other. Thus the band 50 is contracted upon the drum 9 and holds the drum against rotation. This motion of the shaft 41 also carries the projecting shoulder 52' of the collar 52 against the pin 53 with the result that the valves 28 are held open. Clutch pedal 61 is then released and the clutch takes hold. As the drum 9 is locked against rotation the shaft 4 with gear 5 fixed to it will rotate, for example, at one rotation per minute. This motion is increased through the gears 14, 15 and 10' to plate 10 until the outer drum 23 with the cylinders 24 thereon, is travelling at a speed of one and nineteen thirty-seconds revolutions per minute. This causes the gear 12' and plate 12, the inner drum 8' and the gear 22 to revolve in the opposite direction while plate 8 is revolved in the direction of the drum 23 at a speed of three-sixteenths revolutions per minute. Thus it will be apparent that the reduction ratio is five and one-third to one in a direction opposite to that in which the engine is running.

From the foregoing disclosure it will be apparent that in order to change the gearing ratio between the engine shaft 4 and the driven shaft 4', all that is necessary is to depress the clutch pedal 61. Thus the driving of the vehicle is greatly simplified and both hands are constantly left free for steering. It might be stated that the brake pedal 59 is similar to that on the standard car.

When the emergency brake is applied the lever 42 is pulled back from neutral position as in the standard car and the shoulder 42' comes against the shoulder 40' so that the brake is applied. This backward motion of the shaft 41 produces a corresponding rotation of the cams 43 and 48 and also of the collar 52. This will produce no effect on the cams 49 nor on the arm 54 because the cams 43 and 48 move away from the active faces of the cams 49 while the shoulder 52' of the collar 52 simply leaves the pin 53.

If, in addition to the controlling means heretofore described, it should be desired to employ a means for automatically changing the gearing ratio, a mechanism such as illustrated in Figures 6, 7 and 8 could be used. Where this mechanism is employed the driven shaft 4' terminates within a frame 63 connected thereto so as to rotate therewith. Another or larger frame 64 is mounted to rotate about the shaft 4' but with an extension shaft 65 connected to the differential. Cross pins 66 connect opposed portions of the frame 63 while additional cross members 67 connect opposed portions of the frame 64. These pins 66 and cross members 67 are connected by springs 68 preferably adjustable by means of bolts 69 as shown particularly in Figure 7. Thus when one of the frames is rotated relative to the other frame, these springs will be placed under increased tension, as will be apparent. The frame 63 carries cams 70 adapted to engage rollers 71 carried by rods 72. These rods are supported in bearings or guides 73 carried by the frame 64. A thrust bearing 74 is mounted to slide and rotate on the shaft 4' and the ends of the rods 72 are adapted to bear against it. This bearing 74 also thrusts against a lever 75 which is pivotally connected at one end to the housing 1 as shown at 76. The other end of the lever bears against an adjusting screw 77 carried by an arm 78. This arm is connected to the housing 1 by a pin 79 journaled in a lug 80 mounted on the housing 1. The arm 78 contacts with the free end of the cam 55 as clearly shown in Figure 6. A lug 81 is carried by the frame 63 while another lug 82 is carried by the frame 64. It will be apparent, therefore, that when there is no torque these lugs 81 and 82 are held in contact by the springs 68. These lugs are also in contact while the machine is being reversed. The tension of the springs 68 is adjusted by means of the screws 69 until the torque produced in the shaft under normal running conditions will not rotate one of the frames 63 and 64 relative to the other. However should a sudden load be applied or encountered, the torque will be increased above the average and the frame 63 will be shifted relative to the frame 64 and the springs 68 will be placed under increased tension. During this operation the cams 70 come against the rollers 71 and shift the rods 72 longitudinally so that they will thrust against the bearing 74 and in turn force said bearing against the lever 75. Consequently the lever will transmit motion through the screw 77 to the arm 78 which, in turn, will force the cam 55 into position between the rollers 56 and 57 with the result that the valves 28 are opened and the gearing ratio is reduced. The displacement of the frames 63 and 64 is in proportion to the torque produced in the driven shaft and thus a sufficient gear reduction is effected to permit the engine to carry the load.

What is claimed is:

1. In a transmission a drive shaft, a driven shaft, a brake drum mounted for rotation on the drive shaft, connected gears carried by and rotatable relative to the brake drum, a gear fixed on the drive shaft and meshing with one of the gears of the brake drum, a gear rotatable on the shaft and meshing with the other gear on the brake drum, and means for transmitting motion from said gear to the driven shaft, said means including gears, and variable compression means for retarding the gears to vary the ratio of rotation between the shafts.

2. In a transmission a drive shaft and a driven shaft, a brake drum rotatable on the drive shaft, connected gears carried by and rotatable relative to the drum, a gear fixed on the drive shaft and engaged by one of the gears of the drum, a second gear rotatable on the drive shaft and meshing with the other gear on the drum, a housing rotatable with said second gear, and cooperating means upon the drive shaft and within the housing respectively for transmitting motion to the driven shaft.

3. In a transmission a drive shaft, a driven shaft, an outer drum mounted for rotation on the two shafts, an inner drum mounted for rotation on the drive shaft, a gear connection between the inner and outer drums, said connection being carried by the driven shaft, and a brake controlled gear driving connection between the drive shaft and the outer drum.

4. In a transmission a drive shaft and a driven shaft, an outer drum mounted for rotation on the two shafts, an inner drum mounted for rotation about the shafts, concentric gears upon the inner and outer drums gears connected to and revolving with the driven shaft for transmitting motion between the concentric gears, gears connected to and revolving with the drive shaft for transmitting motion from one drum to the other, and friction controlled gearing for transmitting motion from the drive shaft to the outer drum.

5. In a transmission a drive shaft and a driven shaft, an outer drum mounted for rotation on both shafts, an inner drum mounted for rotation about both shafts, annular gears within the respective drums, a central gear rotatable with each drum and surrounded by the annular gear of the other drum, a gear connected to and adapted to revolve with the driven shaft, said gear extending between and meshing with the central gear of the outer drum and the annular gear of the inner drum, gears connected to and adapted to revolve with the drive shaft and arranged between and meshing with the annular gear of the outer drum and the central gear of the inner drum, and friction controlled gearing for transmitting motion from the drive shaft to the outer drum.

6. In a transmission a drive shaft and a driven shaft, an outer drum mounted to rotate upon both shafts, an inner drum mounted to rotate about both shafts, an annular gear and a central gear carried by each drum, the central gear of each drum being surrounded by the annular gear of the other drum, gears connected to and adapted to revolve with the driven shaft and mounted between and meshing with the annular gear of the inner drum and the central gear of the outer drum, gears connected to and adapted to revolve with the drive shaft and supported between and meshing with the annular gear of the outer drum and the central gear of the inner drum, a brake drum mounted to rotate on the drive shaft, connected gears rotatable relative thereto and carried thereby, a gear fixed on the drive shaft and meshing with one of the connected gears, and a gear carried by the outer drum and meshing with the other rotatable gear of the brake drum, and means for controlling the rotation of the brake drum.

7. In a transmission a drive shaft and a driven shaft, an outer drum mounted for rotation on both shafts, an inner drum mounted for rotation about both shafts, annular gears within the respective drums, a central gear rotatable with each drum and surrounded by the annular gear of the other drum, a gear connected to and adapted to revolve with the driven shaft, said gear extending between and meshing with the central gear of the outer drum and the annular gear of the inner drum, gears connected to and adapted to revolve with the drive shaft and arranged between and meshing with the annular gear of the outer drum and the central gear of the inner drum, friction controlled gearing for transmitting motion from the drive shaft to the outer drum, gears meshing therewith and movable with the outer drum, cylinders carried by the outer drum, pistons mounted for reciprocation therein and connected to the last named gears, and means for controlling the compression within the cylinders.

8. In a transmission a drive shaft and a driven shaft, an outer drum rotatable upon both shafts, an inner drum rotatable relative to both shafts, an annular gear and a central gear carried by each drum, the central gear of each drum being surrounded by the annular gear of the other drum, planetary gears connected to the respective shafts, the planetary gears of the drive shaft constituting means for transmitting motion between the central gear of the inner drum and the annular gear of the outer drum and the planetary gears of the driven shaft constituting means for transmitting motion between the central gear of the outer drum and the annular gear of the inner drum, gears carried by the outer drum and rotatable by the rotation of the outer drum relative to the drive shaft, fluid compressing means actuated by the rotation of said gears and means for regulating the compression of the fluid.

9. In a transmission a drive shaft and a driven shaft, an outer drum rotatable upon both shafts, an inner drum rotatable relative to both shafts, an annular gear and a central gear carried by each drum, the central gear of each drum being surrounded by the annular gear of the other drum, planetary gears connected to the respective shafts, the planetary gears of the drive shaft constituting means for transmitting motion between the central gear of the inner drum and the annular gear of the outer drum and the planetary gears of the driven shafts constituting means for transmitting motion between the central gear of the outer drum and the annular gear of the inner drum, gears carried by the outer drum and rotatable by the rotation of the outer drum relative to the drive shaft, fluid compressing means actuated by the rotation of said gears, valves for controlling the compression of the fluid, a rock shaft, means actuated thereby for shifting the valves, a slidable pin, means for actuating the same, and means upon the rock shaft for actuation by the cam.

10. In a transmission a drive shaft and a driven shaft, relatively movable means for coupling the shafts normally permitting independent rotation thereof, compression means operated by the coupling means, and means for controlling the operation of the compression means to vary the operation of the coupling means, thereby to vary the ratio of rotation of the two shafts, said compression controlling means including valves, a rock arm for actuating the valves, a clutch pedal, and means operated by the clutch pedal for producing a full movement of the valves during the first half of the depression of the clutch pedal and no movement during the second half of the depression of the clutch pedal.

11. In a transmission the combination with a driven shaft comprising relative rotatable sections and yielding means for resisting relative rotation of the sections, of a drive shaft, outer and inner drums mounted for rotation about the drive and driven shaft, each drum having an annular gear and a central gear, planetary gearing rotatable with the drive shaft for transmitting motion between the central gear of the inner drum and the annular gear of the outer drum, planetary gearing rotatable with the driven shaft for transmitting motion between the central gear of the outer drum and the annular gear of the inner drum, a cylinder rotatable with the outer drum, a piston therein, means actuated by the rotation of the outer drum relative to the drive shaft for actuating the piston, a valve for controlling the compression of fluid by the piston, and means actuated by the relative rotation of the sections of the driven shaft for actuating the valve.

In testimony that I claim the foregoing as my own, I have hereto affixed my signature.

GUSTAVE ADOLPHUS PEPLE, Jr.